(12) United States Patent
Bai et al.

(10) Patent No.: US 12,003,565 B1
(45) Date of Patent: Jun. 4, 2024

(54) QUALITY FRAMEWORK FOR VEHICLE APPLICATION DATA NETWORKS

(71) Applicant: GM Global Technology Operations LLC, Detroit, MI (US)

(72) Inventors: Fan Bai, Ann Arbor, MI (US); Lakshmi V. Thanayankizil, Troy, MI (US); John Sergakis, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/065,135

(22) Filed: Dec. 13, 2022

(51) Int. Cl.
*H04L 65/80* (2022.01)
*H04W 72/54* (2023.01)

(52) U.S. Cl.
CPC ............. *H04L 65/80* (2013.01); *H04W 72/54* (2023.01)

(58) Field of Classification Search
CPC ................................. H04L 65/80; H04W 72/54
See application file for complete search history.

(56) References Cited

U.S. PATENT DOCUMENTS

| | | | | |
|---|---|---|---|---|
| 9,628,572 | B2* | 4/2017 | Smith | H04W 4/21 |
| 2004/0054766 | A1* | 3/2004 | Vicente | H04L 41/046 |
| | | | | 709/223 |
| 2016/0249309 | A1* | 8/2016 | Kwon | H04W 72/0446 |
| 2017/0103101 | A1* | 4/2017 | Mason | G06F 16/2365 |
| 2017/0223572 | A1* | 8/2017 | Lee | H04W 28/0958 |
| 2017/0373950 | A1* | 12/2017 | Szilagyi | H04L 47/2416 |
| 2018/0220283 | A1* | 8/2018 | Condeixa | H04L 67/12 |
| 2021/0182169 | A1* | 6/2021 | Mardente | G06F 9/5072 |
| 2022/0053368 | A1* | 2/2022 | Li | H04L 47/2425 |
| 2022/0255816 | A1* | 8/2022 | Eriksson | H04L 41/147 |
| 2022/0287042 | A1* | 9/2022 | Huang | H04W 76/15 |
| 2023/0014932 | A1* | 1/2023 | Huang | H04B 7/0413 |
| 2023/0045979 | A1* | 2/2023 | Lei | G05D 1/0212 |
| 2023/0199455 | A1* | 6/2023 | Schrider | H04W 48/18 |
| | | | | 455/414.1 |
| 2023/0217467 | A1* | 7/2023 | Guo | H04W 28/0268 |
| | | | | 370/329 |
| 2023/0403543 | A1* | 12/2023 | Pateromichelakis | ........ |
| | | | | H04L 47/2475 |

FOREIGN PATENT DOCUMENTS

| | | | | |
|---|---|---|---|---|
| WO | WO-2019143752 A1 * | 7/2019 | ........ | G05D 1/0291 |
| WO | WO-2021118829 A1 * | 6/2021 | ........ | G06F 11/3414 |
| WO | WO-2022148995 A1 * | 7/2022 | ........ | H04W 24/02 |

* cited by examiner

*Primary Examiner* — Oanh Duong
(74) *Attorney, Agent, or Firm* — Vivacqua Crane, PLLC

(57) ABSTRACT

A system for providing quality of experience (QoE) metrics to incoming application data transferred to a vehicle includes a cloud-based dynamically updatable application QoE policy engine adapted to establish QoE metrics and prioritization criteria for incoming application data and to assign QoE policies to the vehicle, and a data controller within the vehicle adapted to receive QoE policies from the application QoE policy engine and enforce the QoE policies assigned, wherein the data controller is adapted to enforce the QoE policies assigned with an enhanced distributed control access (EDCA) algorithm adapted to prioritize incoming application data traffic received via IEEE 802.11 standard supported wireless LAN technology channels and with a resource block allocation and network slicing (RAN) algorithm adapted to prioritize incoming application data traffic received via cellular channels.

20 Claims, 3 Drawing Sheets

QUALITY FRAMEWORK FOR VEHICLE APPLICATION DATA NETWORKS

The present disclosure relates to a system and method for providing quality of experience (QoE) metrics to incoming application data transferred to a vehicle. More features are introduced into vehicles having stringent quality requirements, such as gaming, rear seat infotainment streaming, etc. There is a need to ensure that there is an end-to-end QoE framework that guarantees acceptable quality levels.

Incoming data traffic moves across multiple networks. For example, data streamed using a phone hotspot travels through ethernet, IEEE 802.11 standard supported wireless LAN technology and then LTE. Current systems and methods have no unified way for QoE metrics to be translated across different networks. Furthermore, wireless channels change as vehicles move. Thus, QoE metrics must be dynamically linked across different layers of protocol stacks.

Thus, while current systems and methods achieve their intended purpose, there is a need for a new and improved system and method for providing quality of experience (QoE) metrics to incoming application data transferred to a vehicle that provides for consistent translation of QoE metrics across different networks.

SUMMARY

According to several aspects of the present disclosure, a system for providing quality of experience (QoE) metrics to incoming application data transferred to a vehicle includes an application QoE policy engine adapted to assign QoE policies to the vehicle, and a data controller within the vehicle adapted to receive QoE policies from the application QoE policy engine and enforce the QoE policies assigned.

According to another aspect, the data controller is adapted to enforce the QoE policies assigned with an enhanced distributed control access (EDCA) algorithm adapted to prioritize incoming application data traffic.

According to another aspect, the data controller is adapted to enforce the QoE policies assigned with a resource block allocation and network slicing (RAN) algorithm adapted to prioritize incoming application data traffic.

According to another aspect, the application QoE policy engine is adapted to establish QoE metrics and prioritization criteria for incoming application data.

According to another aspect, the data controller is adapted maintain consistent prioritization as data moves across different networks.

According to another aspect, the application QoE policy engine provides QoE metrics to the data controller to allow the data controller to maintain consistent prioritization as data moves across different networks.

According to another aspect, the data controller is adapted to dynamically link QoE metrics across different layers of a protocol stack.

According to another aspect, incoming application data traffic is prioritized within a control plane of the protocol stack, such that QoE metrics are dynamically linked across different layers within a data plane of the protocol stack.

According to another aspect, the application QoE policy engine is dynamically updatable.

According to another aspect, the application QoE policy engine is cloud based and is dynamically updateable wirelessly through the cloud.

According to another aspect, the data controller is adapted to monitor QoE characteristics of incoming application data and measure against QoE metrics in real time as such incoming application data passes through a network.

According to another aspect, the data controller is adapted to aggregate measurements against QoE metrics taken as incoming application data passes through different networks.

According to several aspects of the present disclosure, a method for providing quality of experience (QoE) metrics to incoming application data transferred to a vehicle includes establishing QoE metrics and prioritization criteria for incoming application data and assigning QoE policies to the vehicle with a cloud based dynamically updatable application QoE policy engine, receiving, with a data controller within the vehicle, QoE policies from the application QoE policy engine, and enforcing, with the data controller, the QoE policies assigned.

According to another aspect, the enforcing, with the data controller, the QoE policies assigned further includes enforcing the QoE policies assigned with an enhanced distributed control access (EDCA) algorithm adapted to prioritize incoming application data traffic.

According to another aspect, the enforcing, with the data controller, the QoE policies assigned further includes enforcing the QoE policies assigned with a resource block allocation and network slicing (RAN) algorithm adapted to prioritize incoming application data traffic.

According to another aspect, the method further includes providing, with the application QoE policy engine, QoE metrics to the data controller to allow the data controller to maintain consistent prioritization as data moves across different networks, prioritizing, with the data controller, incoming application data within a control plane of a protocol stack, dynamically linking, with the data controller, QoE metrics across different layers within a data plane of the protocol stack, and maintaining, with the data controller, consistent prioritization as data moves across different networks.

According to another aspect, the method further includes monitoring QoE characteristics of incoming application data, measuring the QoE characteristics against QoE metrics in real time as such incoming application data passes through a network, and aggregating measurements against QoE metrics taken as incoming application data passes through different networks. Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
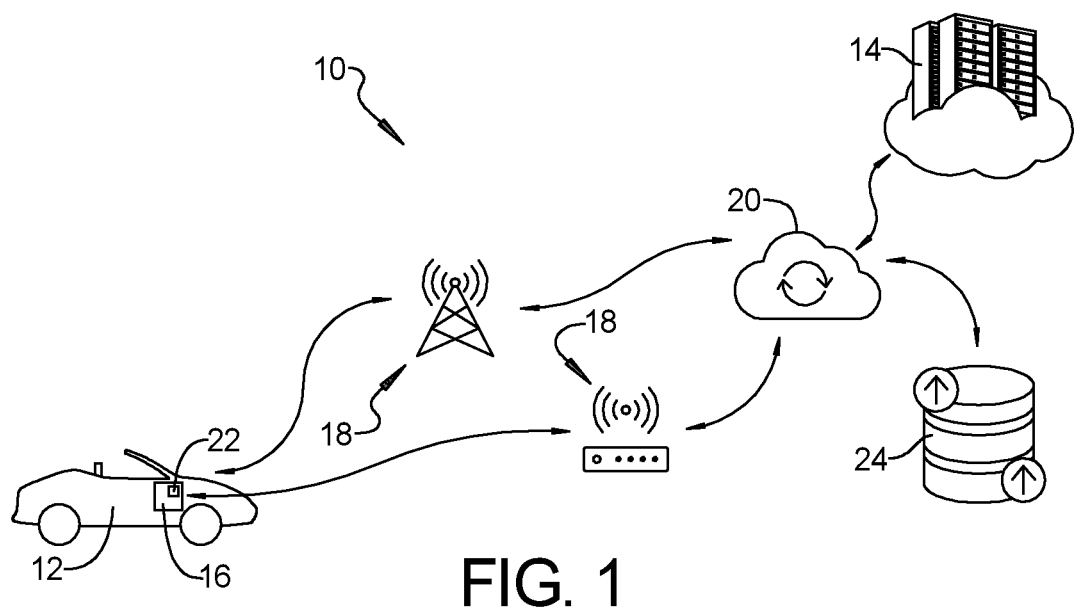
FIG. 1 is a schematic view of a system according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, a system 10 for providing quality of experience (QoE) metrics to incoming application data transferred to a vehicle 12 includes an application QoE policy engine 14 adapted to assign QoE policies to the vehicle 12 and a data controller 16 within the vehicle 12 adapted to receive QoE policies from the application QoE policy engine 14 and enforce the QoE policies assigned.

Each of the application QoE policy engine 14 and the data controller 16 within the vehicle 12 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

In an exemplary embodiment, the application QoE policy engine 14 is cloud-based and communicates wirelessly with the data controller 18 within the vehicle 12 via a wireless communication network 18. The cloud 20 may include any suitable combination of hardware, firmware, software, etc. needed to communicate with the application QoE policy engine 14 and the data controller 16. The cloud 20 may include various combinations of servers, routers, switches, processing units (e.g., central processing units (CPUs)), circuits (e.g., application specific integrated circuits (ASICs)), data storage devices, etc. that are needed to carry out different tasks. Because of the widespread knowledge in the art of edge and cloud architectures, and because the present method 100 and system 10 are not intended to be confined to any particular architecture or arrangement and can be used with a wide range of such architectures, additional detailed descriptions of the edge and cloud systems have been omitted.

The data controller 16 includes a wireless communication module 22 that facilitates wireless communication between the data controller 12 and the application QoE policy engine 14. In addition, the wireless communication module 22 within the data controller 16 allows the data controller 16 to receive data from external sources 24, such as, but not limited to, mapping applications, movie and music streaming providers, etc. The data controller 16 is adapted to send and receive information via the wireless data communication network 18 over wireless communication channels such as a WLAN, 4G/LTE or 5G network, or the like. Such external sources can be communicated with directly via the internet, or may be cloud-based.

The vehicle 12 is equipped with the requisite hardware and software needed to gather, process, and exchange data with the cloud and the application QoE policy engine 14. According to a non-limiting example, the vehicle 12 includes vehicle electronics which include a vehicle control unit and a wireless communication module 22, as well as any other suitable combination of systems, modules, devices, components, hardware, software, etc. that are needed to carry out driving functionality.

The various components of the vehicle electronics may be connected by a vehicle communication network or communications bus (e.g., a wired vehicle communications bus, a wireless vehicle communications network, or some other suitable communications network). Some or all of the different vehicle electronics may be connected for communication with each other via one or more communication busses, such as the communications bus. The communications bus provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications.

Those skilled in the art will appreciate that the schematic diagram of the connected vehicle 12 shown in FIG. 1 is simply meant to illustrate some of the more relevant hardware components used with the present system 10 and method 100 and it is not meant to be an exact or exhaustive representation of the vehicle hardware that would typically be found on such a vehicle 12. Furthermore, the structure or architecture of the vehicle electronics may vary substantially from that illustrated in FIG. 1. Thus, because of the countless number of potential arrangements and for the sake of brevity and clarity, the vehicle electronics are described in conjunction with the illustrated embodiment of FIG. 1, but it should be appreciated that the present system 10 and method 100 are not limited to such.

The wireless communications module 22 provides the vehicle 12 with short range and/or long range wireless communication capabilities so that the vehicle 12 can communicate and exchange data with other devices or systems that are not a part of the vehicle electronics. In the illustrated embodiment, the wireless communication module 22 includes a short-range wireless communications (SRWC) circuit, a cellular chipset, a processor, and memory. The SRWC circuit enables short-range wireless communications with any number of nearby devices (e.g., Bluetooth™, other IEEE 802.15 communications, vehicle-to-vehicle (V2V) communications, vehicle-to-infrastructure (V2I) communications, other IEEE 802.11 communications, etc.). The cellular chipset enables cellular wireless communications, such as those used with a wireless carrier system. The wireless communication module 22 also includes antennas that can be used to transmit and receive these wireless communications, Although the SRWC circuit and the cellular chipset are illustrated as being a part of a single device, in other embodiments, the SRWC circuit and the cellular chipset can be a part of different modules, for example, the SRWC circuit can be a part of an infotainment unit and the cellular chipset can be a part of a telematics unit that is separate from the infotainment unit.

The application QoE policy engine 14 is adapted to assign QoE policies to the vehicle 12. In simple terms, quality of experience is the measure of the overall level of satisfaction of a user with a service from the user's perspective. A first step is being aware of which service parameters are essential for the user to enjoy the service. Therefore, the essence of determining QoE in a particular case depends not so much on the volume or scope of what is to be measured and transformed into metrics. It is rather about knowing which of many service parameters are essential factors in user satisfaction and about measuring them from a perspective as close to the user's perception as possible. QoE policies includes QoE metrics that provide guidelines for acceptable performance of the transmission and receipt, by the vehicle 12, of application data. Depending on the type of signal (audio, video, data) an amount of signal bandwidth is required to allow the signal to be sent/received with acceptable QoE metrics.

Figure 2:
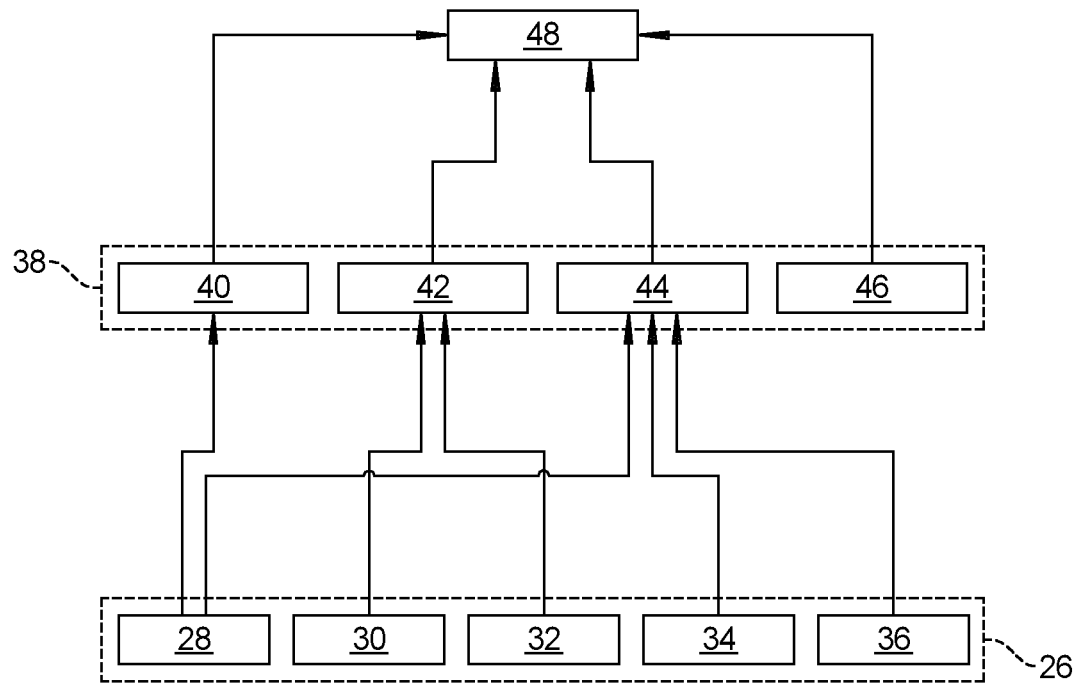
FIG. 2 is a schematic diagram illustrating the development of QoE metrics.

Referring to FIG. 2, parameters that effect the user experience, key network performance indicators (KNPI) 26, include, but are not limited to, features such as throughput 28, jitter 30, latency 32, packet drop rate 34, and signal noise ratio 36. Throughput refers to how many units of information can be processed by a system within a given timeframe. Additionally, throughput can also tell users how many data packets are arriving successfully at their intended destinations. Throughput on networks is often measured in bits per second (bit/s or bps), or alternatively, in data packets per second. Latency describes how long it takes for a packet to be transmitted from a source to a destination. Latency is similar to throughput, in that it's a measurement, however, rather than measuring quantities of data (like throughput), latency instead measures how long it takes for a packet to complete its journey from sender to destination. If a network is experiencing high latency, it directly affects how much data can travel across the network, and reduces throughput as a result. A packet is a single unit of information, and generally they're the smaller pieces of a larger whole. It is much more effective to send things (like images, videos, emails, and just about anything else you see online) this way. Packets travel to and from senders to their destinations, however, not all of them make it. Packet loss or packet drop rate refers to lost packets, and packets that need retransmission. This negatively affects throughput by reducing the amount of data traveling through the network.

When measuring key network performance indicators 26, two methods are implemented. First, link-level network status monitoring measures important KNPI parameters for each individual link in a network transmission. In an exemplary embodiment, the data controller 16 is adapted to monitor QoE characteristics of incoming application data and to measure against QoE metrics in real time as such incoming application data passes through a network. For example, a vehicle 12 communicates, via a first link, with a cellular tower. The cellular tower communicates, via a second link, with the cloud, which communicates, via a third link, with a remote database. Link-level network status monitoring measures KNPI parameters at each of the first, second and third links, in real time.

When measuring a packet drop ratio, the formula is:

$\tilde{P}(t)=\alpha \times P(t)+(1-\alpha)\times \tilde{P}(t-1)$

Where P(t) is the currently measured packet drop ratio, and a is a weighted factor, giving the packet drop ratio compensated at time, t.

Delay is given as:

$\tilde{\tau}(t)=\alpha \times \tau(t)+(1-\alpha)\times \tilde{\tau}(t-1),$

Jitter is given as:

$\tilde{\sigma}(t)=\alpha \times \sigma(t)+(1-\alpha)\times \tilde{\sigma}(t-1)$ and throughput is given as:

$\tilde{T}(t)=\alpha \times T(t)+(1-\alpha)\times \tilde{T}(t-1)$

Second, path-level network status monitoring measures important KNPI parameters for the entire transmission, end to end, including, in the example given above, the first, second and third links. The data controller 16 is adapted to aggregate measurements against QoE metrics taken as incoming application data passes through multiple different networks. For path-level network status monitoring packet drop ratio is given as:

$P_{Path}(t)=1-\Pi_i(1-P_{link}^i)(t),$

Delay is given as:

$\tau_{Path}(t)=\Sigma_i \tau_{link}^i(t),$

Jitter is given as:

$\sigma_{Path}(t) = \max_i \left(\sigma_{link}^i(t)\right),$ and

Throughput is given as:

$T_{Path}(t) = \min_i \left(T_{link}^i(t)\right).$

Determination of acceptable levels of such key network performance indicators 26 establish key application quality indicators (KAQI) 38, such as, but not limited to, application level bandwidth 40, application level delay 42, application level quality 44 and application specific metrics 46. In turn, such key application quality indicators establish quality of experience (QoE) metrics 48.

Throughput is an indication of how much data (or how many packets) is transmitted from a sender within a certain timeframe. This is a practical measurement of actual data. Bandwidth is theoretical. Bandwidth is an indication of how much data could be transmitted from a sender within a given timeframe. Bandwidth is used to refer to the ideal maximum capacity of a network. It's measured in the same way as throughput, in bits per second (bit/s or bps), as well as megabits (Mbps) or gigabits per second (Gbps). Bandwidth is an important factor that affects how much different key network performance indicators 26, such as jitter 30 and latency 32, will affect an incoming signal. Generally, the more bandwidth a signal has, the better the QoE metrics will perform.

In an exemplary embodiment, the data controller 16 is adapted to enforce the QoE policies assigned by the application QoE policy engine 14 with an enhanced distributed control access (EDCA) algorithm 50 adapted to prioritize incoming application data traffic that is transmitted to the vehicle via IEEE 802.11 standard supported wireless LAN technology channels.

Figure 3:
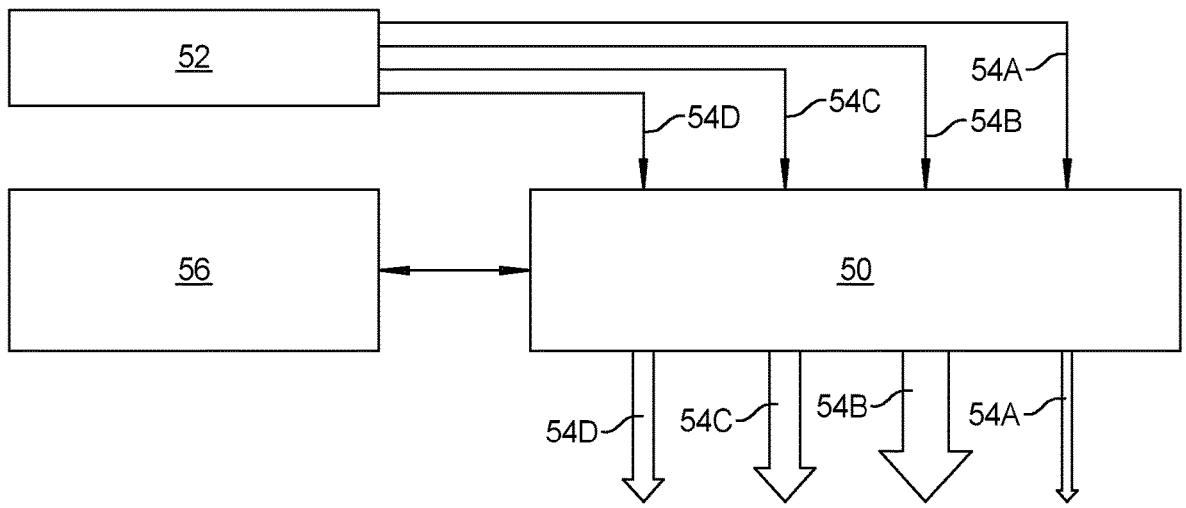
FIG. 3 is a schematic diagram of incoming data traffic being prioritized by an EDCA algorithm.

Referring to FIG. 3, incoming application data traffic 52 is being transmitted from external sources. The EDCA algorithm 50 analyzes the incoming signals 54A, 54B, 54C, 54D and prioritizes the incoming signals 54A, 54B, 54C, 54D with a network analysis module policy engine 56. The application QoE policy engine 14 is adapted to establish QoE metrics and prioritization criteria for incoming application data. Incoming data to the vehicle is limited to an overall bandwidth. Based on the priority assigned by the network analysis module policy engine 56, the EDCA algorithm 50 assigns an appropriate portion of the total bandwidth to each of the different signals 54A, 54B, 54C, 54D. As shown in FIG. 3, four incoming data streams 54A, 54B, 54C, 54D are being transmitted to the vehicle 12. The network analysis module policy engine 56 prioritizes the four data streams 54A, 54B, 54C, 54D, and based on pre-determined criteria, and requirements based on the type of data being transmitted, designates a portion of the total bandwidth of the signal received by the vehicle 12 to each of the four data streams 54A, 54B, 54C, 54D. As shown, a first data stream 54A has the lowest priority and is given the least amount of total bandwidth. A second data stream 54B has the highest priority and is given the largest portion of total bandwidth to ensure QoE metrics are met. Each of the signals 54A, 54B, 54C, 54D is designated a different amount of the overall bandwidth, as visually represented by different sized arrows received by the data controller 16.

In an exemplary embodiment, the data controller 16 is adapted to enforce the QoE policies assigned by the application QoE policy engine 14 with a resource block allocation and network slicing (RAN) algorithm 58 adapted to prioritize incoming application data traffic that is transmitted to the vehicle 12 via cellular channels.

Figure 4:
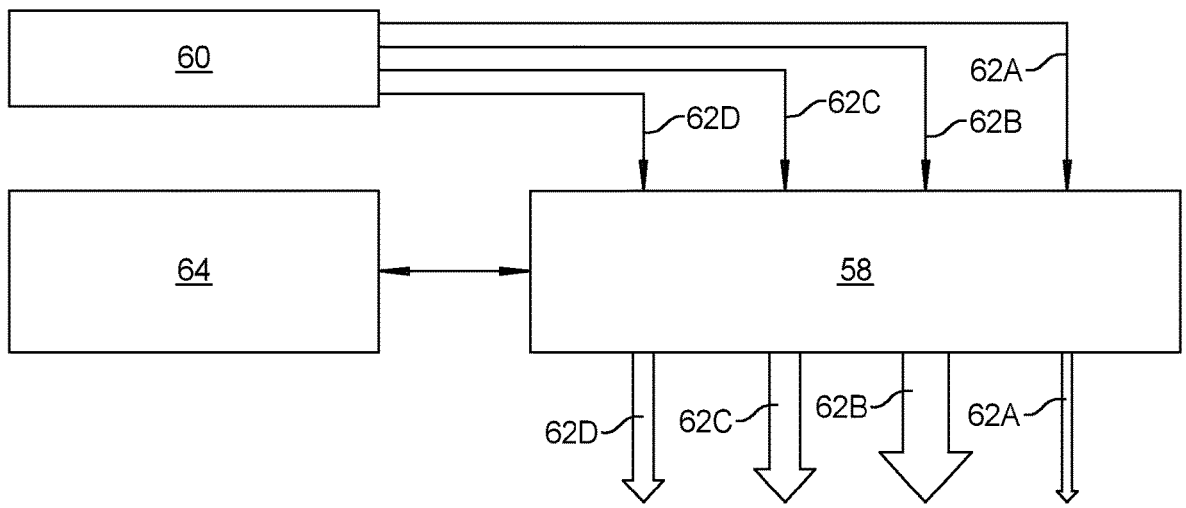
FIG. 4 is a schematic diagram of incoming data traffic being prioritized by a RAN algorithm.

Referring to FIG. 4, incoming application data traffic 60 is being transmitted from external sources. The RAN algorithm 58 analyzes the incoming signals 62A, 62B, 62C, 62D and prioritizes the incoming signals 62A, 62B, 62C, 62D with an application delivery network policy engine 64. The application QoE policy engine 14 is adapted to establish QoE metrics and prioritization criteria for incoming application data. Incoming data to the vehicle 12 is limited to an overall bandwidth. Based on the priority assigned by the application delivery network policy engine 64, the RAN algorithm 58 assigns an appropriate portion of the total bandwidth to each of the different signals 62A, 62B, 62C, 62D. As shown in FIG. 4, four incoming data streams 62A, 62B, 62C, 62D are being transmitted to the vehicle 12. The application delivery network policy engine 64 prioritizes the four data streams 62A, 62B, 62C, 62D, and based on pre-determined criteria, and requirements based on the type of data being transmitted, designates a portion of the total bandwidth of the signal received by the vehicle 12 to each of the four data streams 62A, 62B, 62C, 62D. As shown, a first data stream 62A has the lowest priority and is given the least amount of total bandwidth. A second data stream 62B has the highest priority and is given the largest portion of total bandwidth to ensure QoE metrics are met. Each of the signals 62A, 62B, 62C, 62D is allocated a different amount of the overall bandwidth, as visually represented by different sized arrows received by the data controller 16.

In an exemplary embodiment, the data controller 16 is adapted to maintain consistent prioritization of different data streams as data moves across different networks. Application data goes through multiple networks. For example, when a customer is streaming rear seat infotainment data when connected to a phone hotspot, the data is transferred via ethernet, IEEE 802.11 standard supported wireless LAN technology and then LTE (cellular). The application QoE policy engine 14 provides QoE metrics to the data controller 16 (the network analysis module policy engine 56 and the application delivery network policy engine 64) to allow the data controller 16 to maintain consistent prioritization as data moves across such different networks.

Figure 5:
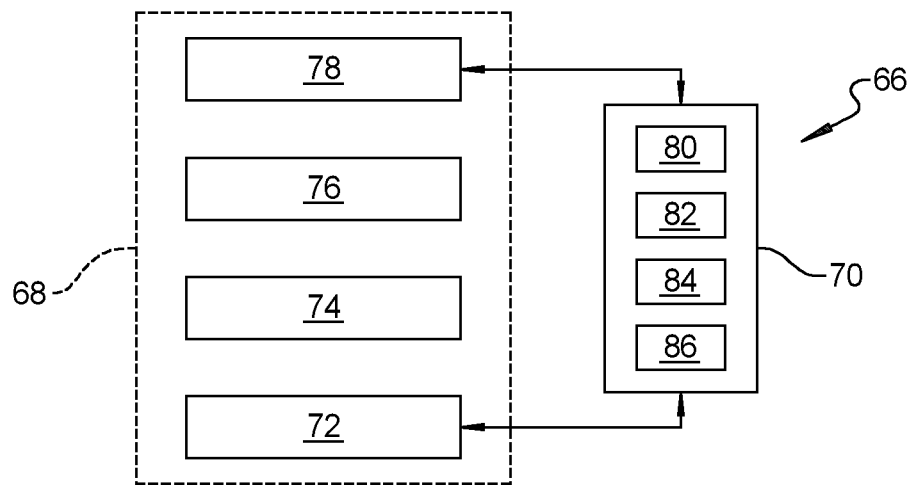
FIG. 5 is a schematic diagram of a protocol stack according to an exemplary embodiment.

Wireless communication by the vehicle 12 is supported by a protocol stack 66. A TCP/IP protocol stack 66 models a series of protocol layers for networks and systems that allows communications between any types of devices. As shown in FIG. 5, the protocol stack 66 includes a data plane 68, that comprises the functions, processes, applications and networks that physically move data, and a control plane 70, that establishes how data is transmitted. As shown, the data plane 68 of the protocol stack 66 includes four separate, but related layers: an access layer 72, a network layer 74, a transportation layer 76 and an application layer 78.

The control plane 70 includes modules adapted to determine how data is to be transported to and from the vehicle. As shown, the control plane 70 includes a decisions support module 80, a QoE metric aggregation and monitoring module 82, a radio resource management monitoring module 84 and a network information reporting module 86.

In an exemplary embodiment, the data controller 16 is adapted to dynamically link QoE metrics across different layers of the protocol stack 66. In this way, the QoE metrics applied to an incoming data stream are consistent as the incoming data stream moves across different networks (Ethernet, IEEE 802.11 standard supported wireless LAN technology, LTE). This is accomplished because incoming application data traffic is prioritized within the control plane 70 of the protocol stack 66. This ensures that QoE metrics are dynamically linked across the different layers 72, 74, 76, 78 within the data plane 68 of the protocol stack 66. The vehicle 12 receives the latest QoE policies from the application QoE policy engine 14 and then uses the corresponding methods, ECDA algorithm 50 and RAN algorithm 58, to enforce the QoE policies assigned to the vehicle 12. These operations are achieved through configuration information sent through the control plane 70 of the protocol stack 66.

In an exemplary embodiment, the application QoE policy engine 14 is dynamically updatable, wirelessly, through the cloud 20. As circumstances change, the system 10 must be able to adapt and properly adjust prioritization of incoming data streams. By way of a non-limiting example, a passenger within a vehicle 12 may download a new application or subscribe to a new application. The system 10 will automatically detect the change in the nature of and number of incoming data streams and adjust priorities accordingly. By way of another non-limiting example, a customer may buy a different subscription package or update an existing subscription package, requiring a change in prioritization of data streams related to the application subscribed to relative to other data streams.

Figure 6:
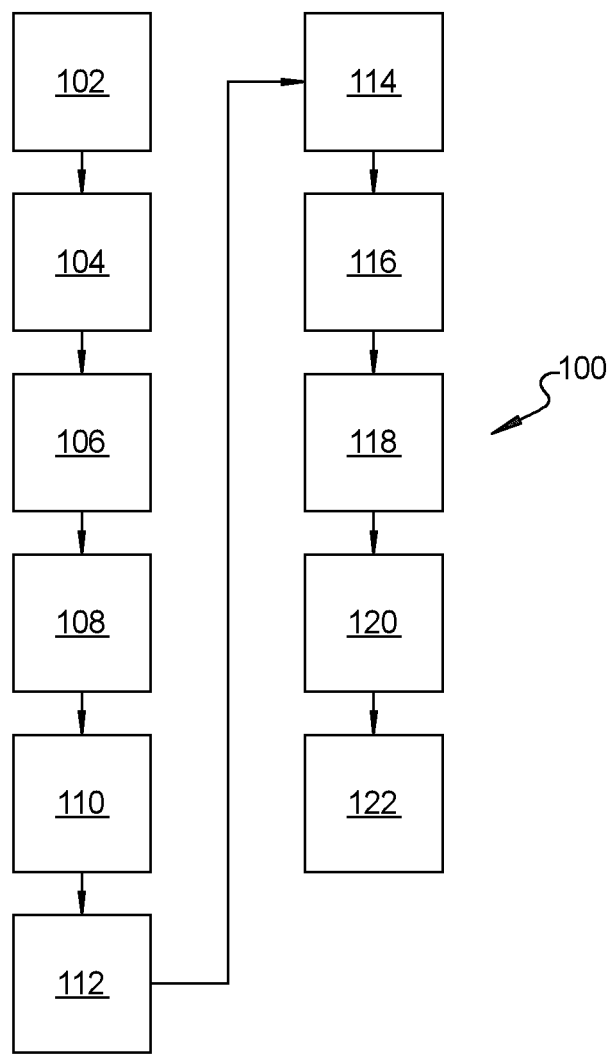
FIG. 6 is a flow chart illustrating a method according to an exemplary embodiment.

Referring to FIG. 6, a method 100 for providing quality of experience (QoE) metrics to incoming application data transferred to a vehicle 12 includes, beginning at block 102, establishing QoE metrics and prioritization criteria for incoming application data and, moving to block 104, assigning QoE policies to the vehicle 12 with a cloud based dynamically updatable application QoE policy engine 14.

Moving to block 106, the method 100 further includes receiving, with a data controller 16 within the vehicle 12, QoE policies from the application QoE policy engine 14, and, moving to block 108, enforcing, with the data controller 16, the QoE policies assigned.

In an exemplary embodiment, the enforcing, with the data controller 16, the QoE policies assigned at block 108, further includes enforcing the QoE policies assigned with an enhanced distributed control access (EDCA) algorithm 50 adapted to prioritize incoming application data traffic. In another exemplary embodiment, the enforcing, with the data controller 16, the QoE policies assigned at block 108, further includes enforcing the QoE policies assigned with a resource block allocation and network slicing (RAN) algorithm 58 adapted to prioritize incoming application data traffic.

In an exemplary embodiment, the method 100 further includes, moving from block 108 to block 110, providing, with the application QoE policy engine 14, QoE metrics to the data controller 16 to allow the data controller 16 to maintain consistent prioritization as data moves across different networks, moving to block 112, prioritizing, with the data controller 16, incoming application data within a control plane 70 of a protocol stack 66, moving to block 114, dynamically linking, with the data controller 16, QoE metrics across different layers 70, 72, 74, 76 within a data plane 68 of the protocol stack 66, and, moving to block 116, maintaining, with the data controller 16, consistent prioritization as data moves across different networks.

In still another exemplary embodiment, the method 100 includes, moving from block 106 to block 118, monitoring QoE characteristics of incoming application data, moving to block 120, measuring the QoE characteristics against QoE metrics in real time as such incoming application data passes through a network, and, moving to block 122, aggregating measurements against QoE metrics taken as incoming application data passes through different networks.

A system 10 and method 100 of the present disclosure provides application of quality of experience (QoE) metrics to incoming application data transferred to a vehicle 12 and prioritization that provides for consistent translation of QoE metrics across different networks.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for providing quality of experience (QoE) metrics to incoming application data transferred to a vehicle, comprising:
   an application QoE policy engine adapted to;
      measure key network performance indicators, including at least throughput, jitter, latency, packet drop rate, and signal noise ratio, by at least one of:
         link-level network status monitoring; and
         path-level network status monitoring;
      establish key application quality indicators, including at least application level bandwidth, application level delay, application level quality and application specific metrics;
      establish QoE metrics and prioritization criteria for incoming application data; and
      assign QoE policies to the vehicle; and
   a data controller within the vehicle adapted to receive QoE policies from the application QoE policy engine and enforce the QoE policies assigned.

2. The system of claim 1, wherein the data controller is adapted to enforce the QoE policies assigned with an enhanced distributed control access (EDCA) algorithm adapted to use a network analysis module policy engine to prioritize incoming application data traffic and to assign an appropriate portion of a total overall available bandwidth to different data streams of the incoming application data traffic.

3. The system of claim 2, wherein the application QoE policy engine is adapted to establish QoE metrics and prioritization criteria for incoming application data that provide guidelines for acceptable performance of the transmission of the incoming application data and receipt of the incoming application data by the vehicle based on signal type and an amount of signal bandwidth required for transmission and receipt of the incoming application data.

4. The system of claim 3, wherein the data controller is adapted to maintain consistent prioritization as data moves across different networks.

5. The system of claim 4, wherein the application QoE policy engine provides QoE metrics to the data controller to allow the data controller to maintain consistent prioritization as data moves across different networks.

6. The system of claim 5, wherein the data controller is adapted to dynamically link QoE metrics across different layers of a protocol stack and apply consistent QoE metrics to the incoming application data traffic as the incoming application data traffic moves across different networks, including, at least, Ethernet, IEEE 802.11 standard supported wireless LAN technology and long-term evolution (LTE).

7. The system of claim 6, wherein incoming application data traffic is prioritized within a control plane of the protocol stack, such that QoE metrics are dynamically linked across different layers within a data plane of the protocol stack.

8. The system of claim 1, wherein the data controller is adapted to enforce the QoE policies assigned with a resource block allocation and network slicing (RAN) algorithm, the resource block allocation and network slicing (RAN) algorithm adapted to use an application deliver network policy engine to analyze and prioritize different signals of the incoming application data traffic and to assign an appropriate portion of a total overall available bandwidth to different data streams of the incoming application data traffic.

9. The system of claim 1, wherein the application QoE policy engine is dynamically updatable.

10. The system of claim 9, wherein the application QoE policy engine is cloud based and is dynamically updateable wirelessly through the cloud.

11. The system of claim 1, wherein the data controller is adapted to monitor QoE characteristics of incoming application data and measure against QoE metrics in real time as such incoming application data passes through a network.

12. The system of claim 11, wherein the data controller is adapted to aggregate measurements against QoE metrics taken as incoming application data passes through different networks.

13. A system for providing quality of experience (QoE) metrics to incoming application data transferred to a vehicle, comprising:
   a cloud-based dynamically updatable application QoE policy engine adapted to:
      measure key network performance indicators, including at least throughput, jitter, latency, packet drop rate, and signal noise ratio, by at least one of:
         link-level network status monitoring; and
         path-level network status monitoring;
      establish key application quality indicators, including at least application level bandwidth, application level delay, application level quality and application specific metrics;
      establish QoE metrics and prioritization criteria for incoming application data and to assign QoE policies to the vehicle; and
   a data controller within the vehicle adapted to receive QoE policies from the application QoE policy engine and enforce the QoE policies assigned; and
   wherein the data controller is adapted to;
      enforce the QoE policies assigned with an enhanced distributed control access (EDCA) algorithm adapted to use a network analysis module policy engine to prioritize incoming application data traffic received via IEEE 802.11 standard supported wireless LAN technology channels,
      enforce the QoE policies assigned with a resource block allocation and network slicing (RAN) algorithm adapted to use an application deliver network policy engine to analyze and prioritize incoming application data traffic received via cellular channels; and
      assign an appropriate portion of a total overall available bandwidth to different data streams of the incoming application data traffic.

14. The system of claim 13, wherein the application QoE policy engine provides QoE metrics to the data controller to allow the data controller to maintain consistent prioritization as data moves across different networks, the data controller adapted to prioritize incoming application data traffic within a control plane of a protocol stack, such that QoE metrics are dynamically linked across different layers within a data plane of the protocol stack.

15. The system of claim 14, wherein the data controller is adapted to monitor QoE characteristics of incoming application data and measure against QoE metrics in real time as such incoming application data passes through an individual network and aggregate measurements against QoE metrics taken as incoming application data passes through different networks.

16. A method for providing quality of experience (QoE) metrics to incoming application data transferred to a vehicle, comprising:
   measuring, with a cloud based dynamically updatable application QoE policy engine, key network performance indicators, including at least throughput, jitter, latency, packet drop rate, and signal noise ratio, by at least one of:
      link-level network status monitoring; and
      path-level network status monitoring;
   establishing, with the QoE policy engine, key application quality indicators, including at least application level bandwidth, application level delay, application level quality and application specific metrics;
   establishing, with the QoE policy engine, QoE metrics and prioritization criteria for incoming application data and assigning QoE policies to the vehicle; receiving, with a data controller within the vehicle, QoE policies from the application QoE policy engine; and
   enforcing, with the data controller, the QoE policies assigned.

17. The method of claim 16, wherein the enforcing, with the data controller, the QoE policies assigned further includes enforcing the QoE policies assigned with an enhanced distributed control access (EDCA) algorithm adapted to use a network analysis module policy engine to prioritize incoming application data traffic and to assign an appropriate portion of a total overall available bandwidth to different data streams of the incoming application data traffic.

18. The method of claim 17, wherein the enforcing, with the data controller, the QoE policies assigned further includes enforcing the QoE policies assigned with a resource block allocation and network slicing (RAN) algorithm adapted to use an application deliver network policy engine to analyze and prioritize incoming application data traffic and to assign an appropriate portion of a total overall available bandwidth to different data streams of the incoming application data traffic.

19. The method of claim 18, further including:
   providing, with the application QoE policy engine, QoE metrics to the data controller to allow the data controller to maintain consistent prioritization as data moves across different networks;
   prioritizing, with the data controller, incoming application data within a control plane of a protocol stack;
   dynamically linking, with the data controller, QoE metrics across different layers within a data plane of the protocol stack; and
   maintaining, with the data controller, consistent prioritization as data moves across different networks.

20. The method of claim 19, further including, with the data controller:
   monitoring QoE characteristics of incoming application data;
   measuring the QoE characteristics against QoE metrics in real time as such incoming application data passes through a network; and
   aggregating measurements against QoE metrics taken as incoming application data passes through different networks.

* * * * *